(12) United States Patent
Bandemer et al.

(10) Patent No.: US 6,446,390 B1
(45) Date of Patent: *Sep. 10, 2002

(54) DRIVE DEVICE FOR A HINGED SIDE WINDOW OF A VEHICLE

(75) Inventors: Joachim Bandemer, Nidderau (DE); Klaus Werner, Kronberg (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/424,220
(22) PCT Filed: Feb. 22, 1999
(86) PCT No.: PCT/EP99/01140
§ 371 (c)(1),
(2), (4) Date: Mar. 20, 2000
(87) PCT Pub. No.: WO99/47781
PCT Pub. Date: Sep. 23, 1999

(30) Foreign Application Priority Data

Mar. 19, 1998 (DE) .......................................... 198 11 976

(51) Int. Cl.⁷ ................................................ E05F 11/00
(52) U.S. Cl. ...................................................... 49/324
(58) Field of Search ........................ 49/324, 340, 341, 49/357; 74/89.2, 89.14; 296/42, 146.16

(56) References Cited

U.S. PATENT DOCUMENTS 4,249,771 A   2/1981  Gergoe et al.
5,203,113 A * 4/1993  Yagi ............................ 49/324
5,438,801 A * 8/1995  Ishihara et al. ........... 49/324 X
5,680,728 A * 10/1997 Moy ............................ 49/324
5,720,584 A * 2/1998  Sijtstra ........................ 409/12
5,966,871 A * 10/1999 Tsuda et al. ................. 49/324
6,056,348 A * 5/2000  Tsuda et al. ................. 49/324
6,073,995 A * 6/2000  Klein ....................... 49/324 X

FOREIGN PATENT DOCUMENTS

| DE | 29709513 | 8/1997 |
| DE | 19706951 | 8/1998 |
| FR | 2717214  | 9/1995 |
| GB | 457572   | 12/1936 |
| WO | 9739258  | 10/1997 |

OTHER PUBLICATIONS

Beitz et al "Taschenbuch für den Mashinenbau/Dubbel" 14th Edition, Springer–Publisher, Berlin 1981, pp. 455, 1055–1056, FIG. 10b.

Periodical "Der Konstrukteur 7–8/93", pp. 59–60.

* cited by examiner

Primary Examiner—Jerry Redman
(74) Attorney, Agent, or Firm—Martin A. Farber

(57) ABSTRACT

A drive device for a hinged side window (1) of a vehicle, said drive device having an actuating drive (8) acting on a operating lever (4) via a transmission element (9), the operating lever (4) being fastened at one end to the hinged side window (1) and at the other end so as to be fixed to the body, and a reduction gear being arranged in the region of the operating lever (4), the reduction gear being a worm gear with an involute toothing.

10 Claims, 3 Drawing Sheets

DRIVE DEVICE FOR A HINGED SIDE WINDOW OF A VEHICLE

FIELD AND BACKGROUND OF THE INVENTION

The invention relates to a drive device for a hinged side window of a vehicle.

A drive device is known from DE 197 06 951.7. This drive device has proved successful in practice, since, on the one hand, the necessary transmission of force from the actuating drive to the hinged side window via the operating lever can be carried out in a very small space, because all the elements have a compact design and force is transmitted along the longitudinal axis of the rotary shaft by means of the rotation of the latter. Other advantages are to be seen in that the reduction gear is arranged in the region of the operating lever, so that said gear takes up only a small amount of construction space, whilst the actuating drive can be mounted at a location in the vehicle, in particular under the rear shelf unit, at which only a small amount of construction space is usually available. Furthermore, the operating lever, designed as a toggle lever, has the advantage that, in the closed position, the hinged side window cannot be opened by force, since the dead center of the toggle lever cannot be overcome from outside.

Despite all the advantages, however, there is still the disadvantage that the drive device as a whole works noisily, since particularly the reduction gear gives rise, when the hinged side window is being opened or closed, to unpleasant noises which have a disturbing effect on the vehicle occupants.

SUMMARY OF THE INVENTION

The object on which the invention is based is, therefore, white preserving the advantages described, to improve the drive device in such a way that the noise emission of the drive device is effectively reduced and low-noise movement of the hinged side window from one position into the other, along with the least possible wear, is ensured.

The advantage of providing the reduction gear as a worm gear is that it is possible, in a very small space, to achieve a reduction which optimally utilizes the available construction space by virtue of the geometric design of the worm gear (gearwheel on the operating lever and worm wheel at the end of the transmission element). It must be remembered, here, that very little construction space is available in the region in which the operating lever (toggle lever) is arranged, because, on the one hand, the operating lever should not project too far into the interior, so as to avoid risks of injury, and, furthermore, it should have an agreeable appearance. Moreover, the force necessary for moving the hinged side window has to be transmitted in the small construction space. All this is ensured by designing the reduction gear as a worm gear. It is also advantageous that the worm gear has involute toothing, thus ensuring that the drive device as a whole runs quietly. This involute toothing also has the advantage that simple and accurate production by the enveloping cut method (particularly in the case of a straight-flanked reference profile of the worm gear) is possible and, furthermore, the worm gear has interchangeable wheel properties, by means of which uniform movement transmissions, even in the case of center-to-center deviations, are possible. This is particularly important in the large series production of the drive device according to the invention, since the production costs fall in a beneficial way if there is an optimum cycle of movement and, at the same time, the precision required is not too high.

In a development of the invention, the involute toothing has a protuberant profile. The advantage of such a protuberant profile is that the tooth root of the gearwheels, in particular of the gearwheel meshing with the worm, cuts freely, so that notches caused by the rubbing of the toothing are avoided. If a large tooth depth, in particular more than double the useful flank, is selected, particularly quiet-running properties are possible. The gearwheels can be produced in large quantities in a simple way by appropriately shaped protuberant tools, and, here again, the costs of large series production are lowered.

In a development of the invention, the worm gear is made to be self-locking thus ensuring the hinged side window is detained in any desired position between its closed position and its open position after the actuating drive of the drive device has been switched off in this position just set, so that fluttering of the hinged side window is avoided. Moreover, in the closed position, the risk of break-ins is reduced.

In a development of the invention, one gearwheel of the worm gear consists of metal, whilst the other gear wheel consists of plastic. This choice of material also, again, ensures particularly quiet running properties of the drive device, and, here, not only is the use of metal and plastic considered for the worm gear in the region of the operating lever, but such pairings of material may also be employed in a gear which, if appropriate, is used in the actuating drive. The pairing of metal/plastic material also has the advantage that there is no need for interference suppression measures which would be necessary in the case of a pairing of metal/metal materials.

In a development of the invention, the worm wheel consists of brass and the gearwheel of the plastic polyoxymethylene, with the result that the worm wheel can be very easily connected, in particular soldered or welded, to the rotary shaft of the transmission element. This eliminates a fault source, specifically if different pairings of material have to be connected to one another. This would be the case if the rotary shaft were to consist of a metal and the worm wheel a plastic. Should different pairings of material nevertheless be used for the rotary shaft and the worm wheel or for the gearwheel meshing with the worm wheel and the operating lever, connections by positive locking are particularly advantageous, since such positive locking is virtually independent of the pairing of material. The choice of material is particularly advantageous because the running properties are very good, a particularly long service life, in particular over a life cycle of the vehicle, is afforded and interference signals, which would occur in the case of a pairing of metal/metal material are also avoided.

In a development of the invention, the operating lever has at least two levers, the two levers being rotatably connected to one another, and one lever being arranged on the hinged side window and the other lever being arranged rotatably on the part fixed to the body. In order to operate the operating lever (the toggle lever), one lever is connected to the gearwheel, and this, in turn, may be carried out, for example, by positive locking. A particularly advantageous design is afforded when the lever and the gearwheel form a structural unit, the lever and the gearwheel being produced, in particular, from the same material (plastic) and the connection being achieved by adhesive bonding. Furthermore, it is also conceivable for the lever and the gearwheel to form a structural unit in the sense that both parts are shaped in one production step.

In a development of the invention, a mounting is provided only in the region of the worm wheel and the end of a rotary shaft in the transmission element. If the mounting in this region is given appropriate dimensions, further mountings, in particular a bearing point at the end of the worm wheel arranged on the rotary shaft, may be dispensed with, so that, again, the scant construction space is optimally utilized.

BRIEF DESCRIPTION OF THE DRAWINGS

Embodiments of the drive device according to the invention, to which the invention is not restricted however, are described below and are explained by means of the figures, of the drawings in which.

DETAILED DESCRIPTION OF THE PREFERRED EMBODIMENT

Figure 1:
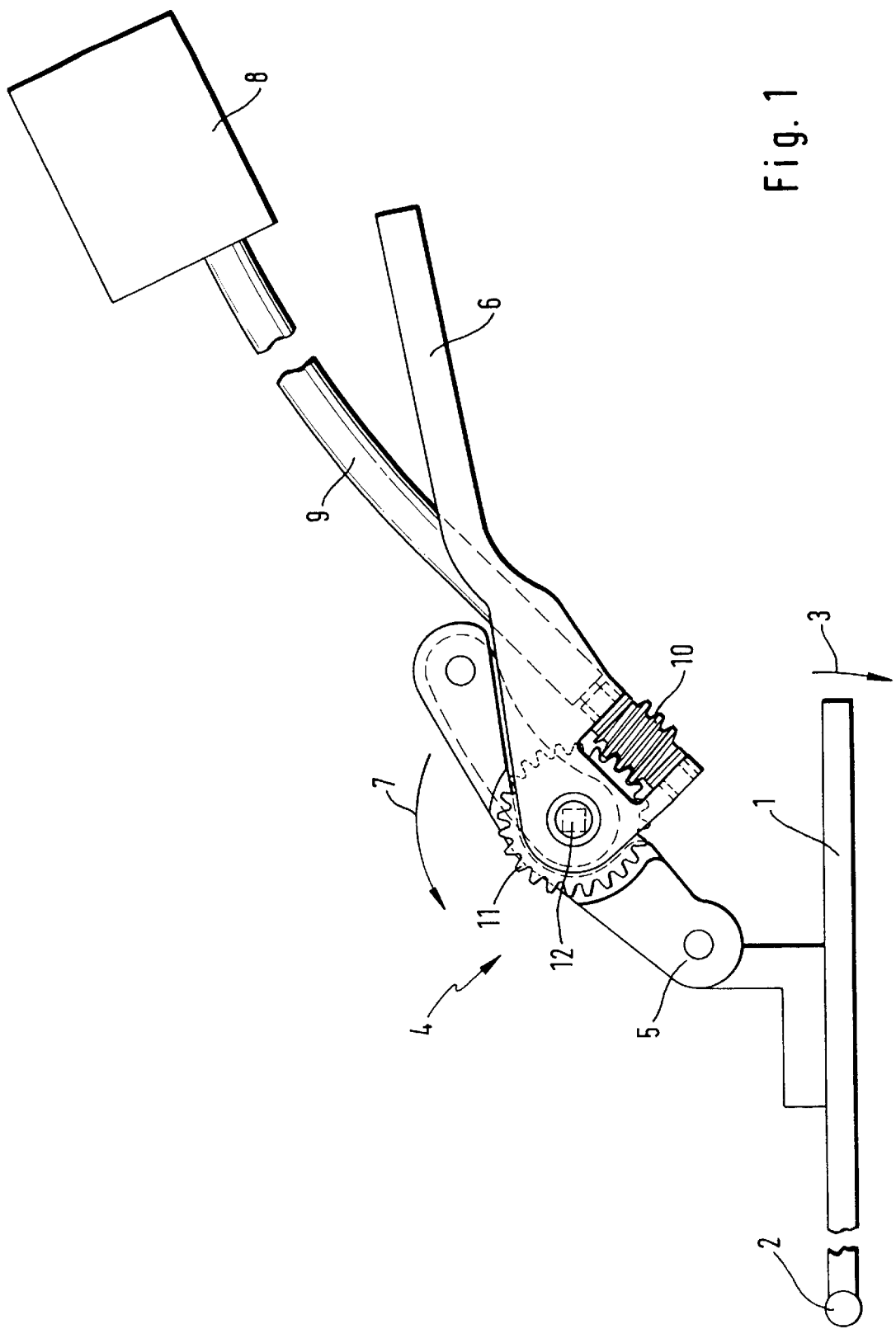
FIG. 1 shows a drive device for a hinged side window.

A hinged side window 1 can be opened about a center of rotation 2 in a direction of rotation 3 in a way known per se. FIG. 1 shows the closed position of the hinged side window 1. The hinged side window 1 can be opened in the direction of rotation 3 via an operating lever 4 which is fastened, at one end, to the hinged side window 1 by means of a fastening point 5 (in particular, rotationally movably or via a ball joint) and, at the other end, fixedly (so as to be fixed to the body) via a fastening point 6. For this purpose, the operating lever 4 formed as a toggle lever executes a movement in a pivoting direction 7. This movement in the pivoting direction 7 is generated by an actuating drive 8 which, in a particularly advantageous way, is an electric motor with or without a reduction gear. The rotational movement of the actuating drive 8 is transmitted, via a transmission element designed as a rotary shaft 9, to a worm wheel 10 which is arranged in the region of the operating lever 4. The worm wheel 10 meshes with a gearwheel 11 which is arranged on an axis of rotation 12 of the operating lever 4. The rotation generated by the actuating drive 8 is thereby transmitted, reduced, to the operating lever 4, and the hinged side window 1 is opened in the pivoting direction 7, the direction of rotation of the actuating drive 8 being reversed in order to move the hinged side window 1 inward. Moreover, devices for detecting at least the two end positions (open, closed) of the hinged side window 1 may also be provided, which may be, for example, switches for detecting the end positions, whilst it is also conceivable for the number of revolutions of the worm wheel 10 or of the gearwheel 11 to be counted or else for the actuating drive to be switched on for a predeterminable time which is sufficient for moving the hinged side window 1 from one position into the other.

Figure 2:
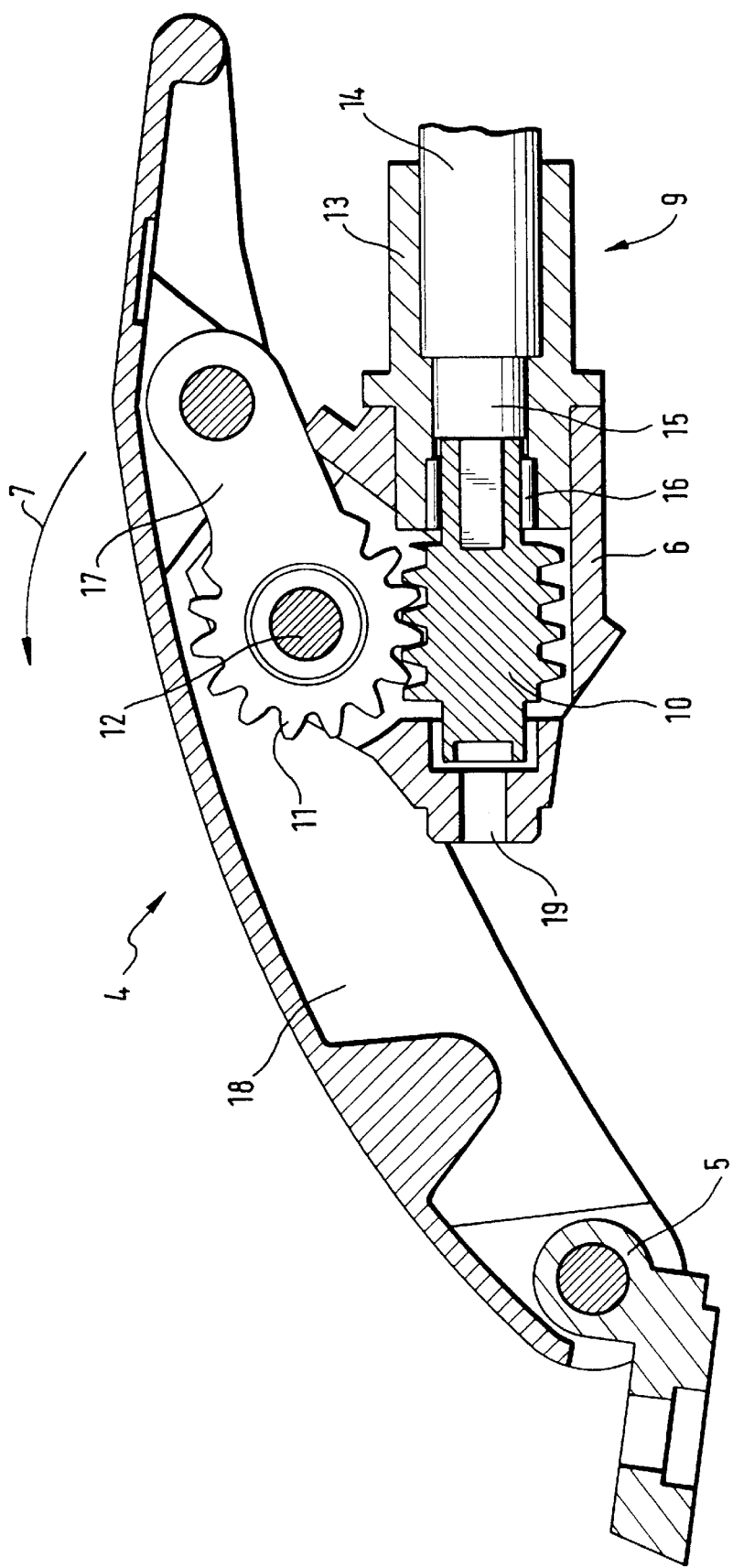
FIG. 2 shows the design of an operating lever.

FIG. 2 shows the form of the operating lever, as used, for example, in the arrangement according to FIG. 1. In addition to the elements already shown in FIG. 1 and given the same reference numerals, the transmission element 9 is illustrated more clearly in FIG. 2, in FIG. 2 this transmission element 9 having, at its end facing the operating lever 4, a bearing housing 13, into which the end of a Bowden cable 14, having a rotary shaft 15 rotatably mounted about its longitudinal axis therein, projects. The rotary shaft 15 is rotated about its longitudinal axis by the actuating drive 8, not shown here, and carries at its end the worm wheel 10. Provided in the region in which the worm wheel 10 is fastened on the axis of rotation 15 is a mounting 16 which receives either part of the worm wheel 10 or part of the rotary shaft 15.

FIG. 2 also shows that the operating lever 4 formed as a toggle lever has a first lever 17 and a further lever 18. The first lever 17 is, at one end, movable about the axis of rotation 12 and is connected to the gearwheel 11, so that operating the first lever 17 about the axis of rotation 12 causes this lever 17 to be pivoted outward in the pivoting direction 7. At the other end, the first lever 17 is rotatably connected to a further lever 18, this further lever 18 being arranged rotatably at its other end at the fastening point 5 and a connection to the hinged side window 1 being made via this fastening point 5. The geometries (lengths) and the shape of the two levers 17 and 18 are selected in such a way that, in the closed position shown in FIG. 2, a dead center first has to be overcome before the hinged side window 1 can be opened. The advantage of having to overcome the dead center both in the opening and in the closing direction is that, for example during closing, after the dead center has been overcome the hinged side window 1 is pulled even further in the direction of a seal, so that the latter sealingly closes the hinged side window 1.

Furthermore, FIG. 2 shows that, at the outermost end of the worm wheel 10, there is a further mounting 19 which, however, may be unnecessary due to the formation of the involute toothing of the reduction gear 10, 11. This mounting 19 may become necessary for the situation where there is not sufficient construction space available for adequate dimensioning of the mounting 16. If, however, the worm wheel 10 is selected to be sufficiently short, the mounting 19 may be dispensed with, in which case the bearing housing 13 is open or preferably closed in this region, in order to avoid the reduction gear being soiled The bearing housing 13 receives the bearing of the mounting 16 and forms a unit capable of being slipped onto or otherwise fastened to the transmission element 9. The bearing housing 13 and a reduction gear housing not designated in any more detail may also be connectable to one another or form an independent compact structural unit.

Figure 3:
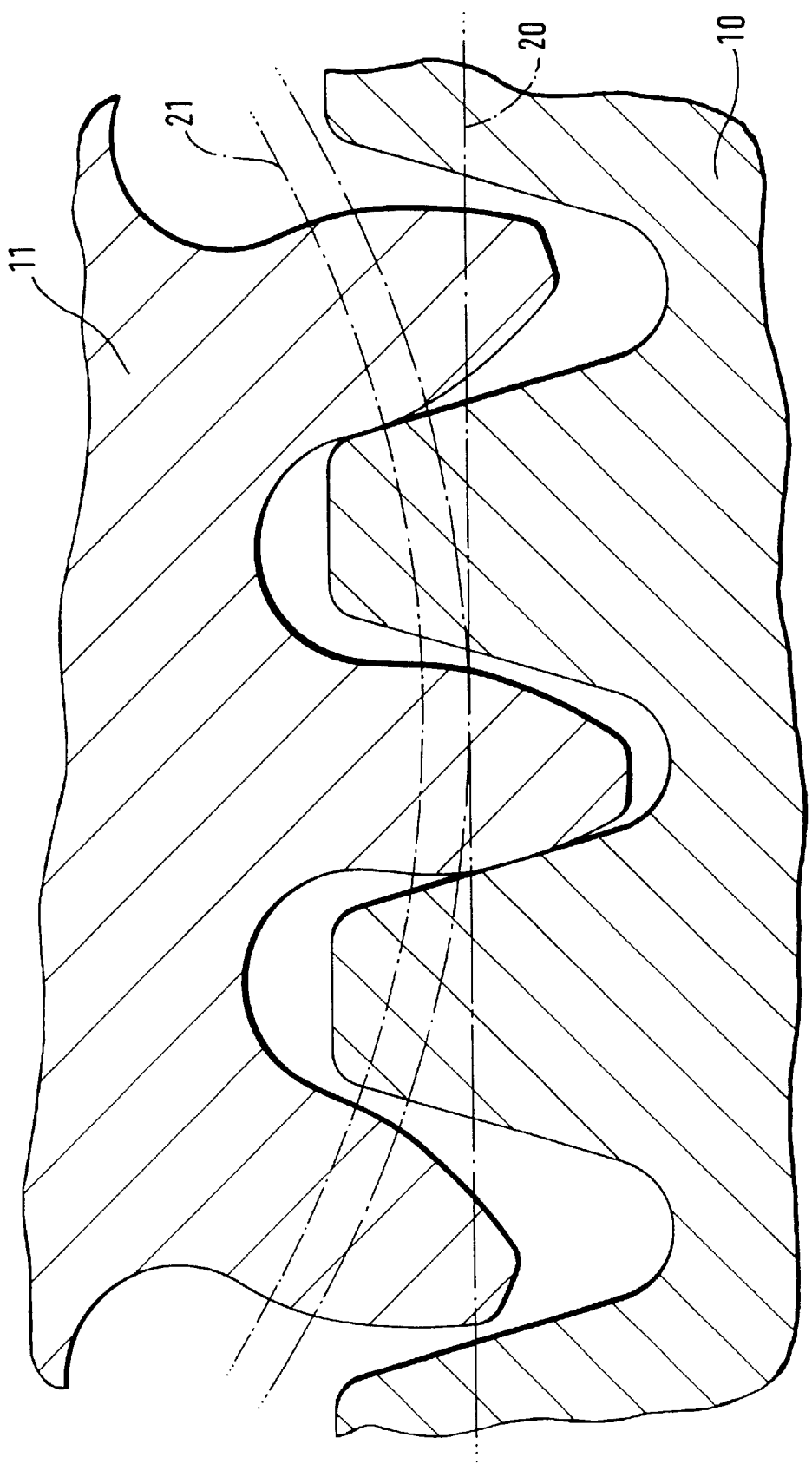
FIG. 3 shows the involute toothing of the worm gear.

FIG. 3 shows the involute toothing of the reduction gear 10 and 11, the use of this involute toothing of the reduction gear 10, 11 being particularly advantageous for the reasons described initially. For the sake of completeness, the base circle 20 for the worm wheel 10 and the pitch circle 21 for the gearwheel 11 are also indicated.

The involute toothing is to be coordinated according to formulas known per se with the displacements and torques to be transmitted.

List of Reference Symbols

1 Hinged side window
2 Center of rotation
3 Direction of rotation
4 Operating lever
5 Fastening point
6 Fastening point
7 Pivoting direction
8 Actuating drive
9 Transmission element (bowden cable and rotary shaft)
10 Worm wheel
11 Gearwheel
12 Axis of rotation
13 Bearing housing
14 Bowden cable
15 Rotary shaft
16 Mounting
17 First lever
18 Further lever
19 Mounting
20 Base circle
21 Pitch circle

What is claimed is:

1. A window assembly including a hinged side window with a drive device for pivoting the hinged side window (1), the window assembly being suitable for a vehicle, said drive device having an actuating drive (8) acting with rotating movement on an operating lever (4) via a rotary transmission element (9), the rotary transmission element comprising a Bowden cable with a rotary shaft (15), the operating lever (4) is a toggle lever having a first lever (17) and a further lever (18), the first lever (17) is at one end movable about an axis of rotation (12) and is connected to a gearwheel (11), a rotation about the axis causes the first lever (17) to be pivoted, at the other end of the first lever (17) is rotatably connected to the further lever (18), the further lever (18) is arranged rotatably at its other end to the hinged side window (1), and a reduction gear (10) being arranged in a region of the operating lever (4), wherein the reduction gear is a worm gear with an involute toothing and driven by the rotary shaft.

2. The drive device for a hinged side window (1) as claimed in claim 1, wherein said involute toothing has a protuberant profile.

3. The drive device for a hinged side window (1) as claimed in claim 1, wherein the worm gear is self-locking.

4. The drive device for a hinged side window (1) as claimed in claim 1, wherein a gear wheel of the worm gear comprises metal, the other gear wheel comprising plastic.

5. The drive device for a hinged side window (1) as claimed in claim 1, wherein the worm wheel (10) comprises brass and the gear wheel (11) comprises polyoxymethylene.

6. The drive device for a hinged side window (1) as claimed in claim 1, wherein said operating lever (4) has at least two levers (17, 18), the lever (17) and the gear wheel (11) forming a structural unit.

7. The drive device for a hinged side window (1) as claimed in claim 1, wherein a mounting (16) is provided only in a region of the worm wheel (10) and an end of the rotary shaft (15) of the transmission element (9).

8. The drive device for a hinged side window (1) as claimed in claim 1, wherein a bearing housing (13) is provided in an end region of the transmission element (9).

9. A window assembly including a hinged side window with a drive device for pivoting the hinged side window (1), the window assembly being suitable for a vehicle, said drive device having an actuating drive (8) acting with rotating movement on an operating lever (4) via a rotary transmission element (9), the rotary transmission element comprising a Bowden cable with a rotary shaft (15), the operating lever (4) being fastened at one end to the hinged side window (1) and at the other end being fixed to a body wherein the operating lever (4) is a toggle lever having a first lever (17) and a further lever (18), the first lever (17) is at one end movable about an axis of rotation (12) and is connected to a gearwheel (11), a rotation about the axis causes the first lever (17) to be pivoted, at the other end the first lever (17) is rotatably connected to the further lever (18) the further lever (18) is arranged rotatably at its other end to the hinged side window, and a worm gear with an involute toothing being arranged in a region of the operating lever (4), the worm gear being driven by the rotary shaft wherein a mounting (16) is arranged only in a region of the worm wheel (10) and an end of the rotary shaft (15) of the transmission element (9), wherein a bearing housing (13) of the mounting has a bearing disposed therein, said bearing housing being provided in an end region of the transmission element (9), wherein said bearing housing (13) and said bearing (16) form a unit which is fastened to the transmission element (9).

10. A window assembly including a hinged side window with a drive device for pivoting the hinged side window (1), the window assembly being suitable for a vehicle, said drive device having an actuating drive (8) acting with rotating movement on an operating lever (4) via a rotary transmission element (9), the rotary transmission element comprising a Bowden cable with a rotary shaft (15), the operating lever (4) is a toggle lever having a first lever (17) and a further lever (18), the first lever (17) is at one end movable about an axis of rotation (12) and is connected to a gearwheel (11), a rotation about the axis causes the first lever (17) to be pivoted, at the other end of the first lever (17) is rotatably connected to the further lever (18), the further lever (18) is arranged rotatably at its other end to the hinged side window (1), and a reduction gear (10) being arranged in a region of the operating lever (4), wherein the reduction gear is a worm gear with an involute toothing and driven by the rotary shaft and the worm gear is self-locking.

* * * * *